United States Patent [19]

Sansom et al.

[11] Patent Number: 5,251,342
[45] Date of Patent: Oct. 12, 1993

[54] PLASTIC PORTABLE TOILET ASSEMBLY

[75] Inventors: Clyde B. Sansom, St. Louis, Mo.; David C. Keeling; Kenneth C. Wilken, both of Minneapolis, Minn.; Ronald D. Olson, Portage; Michael J. Wolfe, Pardeeville, both of Wis.

[73] Assignee: Synergy World, Inc., St. Louis, Mo.

[21] Appl. No.: 789,069

[22] Filed: Nov. 7, 1991

[51] Int. Cl.$^5$ .................... A47K 11/00; A47K 11/12
[52] U.S. Cl. ............................. 4/462; 4/449; 220/4.13
[58] Field of Search ............... 4/144.1, 321, 322, 323, 4/449, 459, 460, 461, 462, 463, 476, 477, 478, 309; 220/480, 4.13; 264/545

[56] References Cited

U.S. PATENT DOCUMENTS

| | | | |
|---|---|---|---|
| 3,001,206 | 9/1961 | Strehlke | 4/460 |
| 3,066,311 | 12/1962 | Tharp | 4/462 |
| 3,074,076 | 1/1963 | Kersten | 4/459 |
| 3,225,951 | 12/1965 | Poston et al. | 220/480 X |
| 3,447,167 | 6/1969 | Harding | 4/478 X |
| 3,570,016 | 3/1971 | Ellis et al. | 4/459 X |
| 3,629,874 | 12/1971 | Beller | 4/462 |
| 3,835,480 | 9/1974 | Harding | 4/459 |
| 3,925,140 | 12/1975 | Brown | 156/382 |
| 4,031,572 | 6/1977 | Harding | 4/463 X |
| 4,065,885 | 1/1978 | Blick, III et al. | 52/143 |
| 4,163,294 | 8/1979 | Patterson | 4/449 |
| 4,192,701 | 3/1980 | Martin et al. | 264/545 X |
| 4,305,164 | 12/1981 | Sargent et al. | 4/462 |
| 4,446,585 | 5/1984 | Harding et al. | 4/460 |
| 4,493,118 | 1/1985 | Braxton | 4/460 |
| 4,505,690 | 4/1970 | Lockwood | 4/321 X |
| 4,574,403 | 3/1986 | Dintemann et al. | 4/309 |
| 4,744,111 | 5/1988 | Tegg etal. | 4/460 |
| 5,005,227 | 4/1991 | White | 4/449 |

OTHER PUBLICATIONS

Portable FiberGlass Systems, The Phil Carter System Incorporated, Newport News, Va.
Selector Guide, Poly-John Profit-Builders, Poly-John Enterprises Corp., Whiting, Ind.
Tomorrow's Concepts for Today's Environment, Poly-Portables, Inc., Dahlonega, Ga.
Buy Poly-San: Now Even Better, Poly-San Company, Albany, N.Y.
A Little Consideration Goes a long Way, Satellite Industries, Inc., Minneapolis, Minn.
Synergy S 4000, Synergy III Industries, Inc., Houston, Tex., 1989.
Photographs of blow-molded portable toilet. Elements manufactured by Synergy World, Inc., St. Louis, Mo.

Primary Examiner—Henry J. Recla
Assistant Examiner—Robert M. Fetsuga
Attorney, Agent, or Firm—Lathrop & Clark

[57] ABSTRACT

A portable toilet assembly has a twin-sheet thermoformed toilet tank, base, and urinal. The toilet tank has an upper thermoplastic sheet which is fused to a lower thermoplastic sheet. The toilet tank sheets are each coextruded from two thermoplastic materials of different colors, such that the toilet tank interior is a dark color and the exterior is a lighter color. Portions of the fused sheets extend outwardly from the tank and define flanges which can be used to attach the toilet tank to the toilet base and to the walls of a cabana. The toilet tank lower sheet has a downwardly extending pyramidal sump in which waste can accumulate. The base has a hole for receiving the toilet tank, a platform with downwardly extending sidewalls with outwardly extending ledges, and channels which extend through the sidewalls and ledges which allow flow of liquids from within the cabana and ventilation of noxious odors. The lower portion of the base has axle bearings in which an axle can be placed which runs parallel to the front and rear sides of the base. A urinal is attached to the toilet tank. The urinal has an interior surface with projections which contain and hold a solid deodorant.

11 Claims, 5 Drawing Sheets

PLASTIC PORTABLE TOILET ASSEMBLY

FIELD OF THE INVENTION

This invention relates to toilets and sanitary facilities in general, and to non-plumbed, portable toilet assemblies in particular.

BACKGROUND OF THE INVENTION

Portable toilet assemblies are commonly used at construction sites, parks, outdoor recreational events, and wherever toilets are needed for a limited time period only or where sanitary sewers are unavailable.

The toilet may be transported to the site of use, erected, and utilized at a particular location for a day, a week, a month or longer. Because there is no connection of the toilet to water or sewer utilities, the waste holding tank must be emptied and the waste transported to a disposal site on a regular basis, the frequency of this service depending on toilet usage. Furthermore, the toilet assembly and surrounding structure must be frequently cleaned to prevent odors and maintain sanitary conditions.

Because of the frequent transport, portable toilets should be lightweight and capable of being disassembled into easily transportable segments. Blow-molded plastic tank and base assemblies are known which advantageously reduce the weight of the structure. However, blow-molded tanks do not provide desirable wall thickness and stiffness and are difficult to secure to other structures without the risk of puncturing the tank. It is desirable, however, in order to present a pleasant atmosphere for the toilet user, that the structure be as stiff as possible and be resistant to vibrations and unpleasant instability.

The appearance of a portable toilet is also of importance in making its use acceptable. Toilets which are light in color provide a sanitary and pleasant appearance, but also unacceptably accentuate the contents of the toilet tank. Dark colored toilets obscure the tank contents, but also give a closed-in, less sanitary appearance to the assembly.

What is needed is a portable toilet assembly that is easy and economical to manufacture, durable, lightweight, stable in use, easily transportable, easy to clean, pleasant to use, and simple to repair when damaged.

SUMMARY OF THE INVENTION

The portable toilet assembly of this invention has a toilet tank, a toilet tank base and a urinal. The toilet tank, the toilet base and the urinal are each twin-sheet thermoformed from an upper sheet and a lower sheet of thermoformed plastic. The sheets of the toilet tank each have two layers of coextruded thermoplastic. The first layer is a different color than the second layer.

The thermoplastic tank upper sheet has a tank opening on the top for admitting waste. The thermoplastic tank lower sheet is fused to the upper sheet to form a hollow cavity for receiving and containing waste admitted through the tank opening. The cavity formed by the fused sheets is substantially one color and the exterior of the tank is substantially another color.

The tank lower sheet has an inverted pyramid-shaped sump on the bottom. Flanges formed from the fused upper and lower sheets protrude from the tank exterior. The flanges have portions defining a hole which is adapted to receive a fastener.

Flanges extend upwardly from the tank top at the right and left sides and are adapted for fastening the tank to a cabana wall. Flanges extend forwardly from the tank bottom on the right and left sides. The bottom flanges are fastened to the toilet tank base. The toilet tank top also has an opening for a ventilation stack and an opening for receiving a urinal discharge tube.

The toilet tank base is formed of a thermoplastic base upper sheet and a thermoplastic base lower sheet. The base upper sheet and lower sheet are fused together to form a base with a platform and have portions defining a hole for receiving the toilet tank. The base upper sheet has a vertical sidewall and a ledge extending outwardly from the sidewall. The base has depressions which extend vertically in the side walls and which extend horizontally in the ledge to permit the escape of liquids and gases when cabana walls are mounted to the base. The underside of the base has two sets of axle bearings spaced to accommodate an axle with wheels mounted thereon to facilitate moving the assembly with an attached cabana.

The twin-sheet thermoformed plastic urinal has a urinal bowl and a urinal discharge tube. The bottom urinal bowl interior has a portion protruding outwardly and raised sufficiently to retain a solid deodorant.

The toilet tank also has a seat which can be fastened onto the tank upper sheet tank opening.

It is an object of this invention to provide a portable toilet assembly formed of thermoplastic material which is sturdy, stiff and resistant to buckling and folding.

It is a further object of the present invention to provide a portable toilet tank that is easy to clean.

It is also an object of the present invention to provide a portable toilet assembly that permits efficient drainage of fluids from the base for sanitary purposes.

It is an additional object of the present invention to provide a thermoplastic toilet tank which may be rigidly attached to a base.

It is also an object of the present invention to provide a thermoplastic toilet tank which has a dark interior and a light exterior.

It is a still further object of the present invention to provide a portable toilet assembly that has provisions for ease of transportation when moving is necessary.

It is another object of the present invention to provide a rigid tank and base assembly which may be easily disassembled for transport and repair.

It is yet another object of the present invention to provide a portable toilet assembly which can be manufactured efficiently and economically from thermoplastic materials.

Further objects, features, and advantages of the invention will be apparent from the following detailed description when taken in conjunction with the accompanying drawings.

DESCRIPTION OF THE PREFERRED EMBODIMENT

Figure 1:
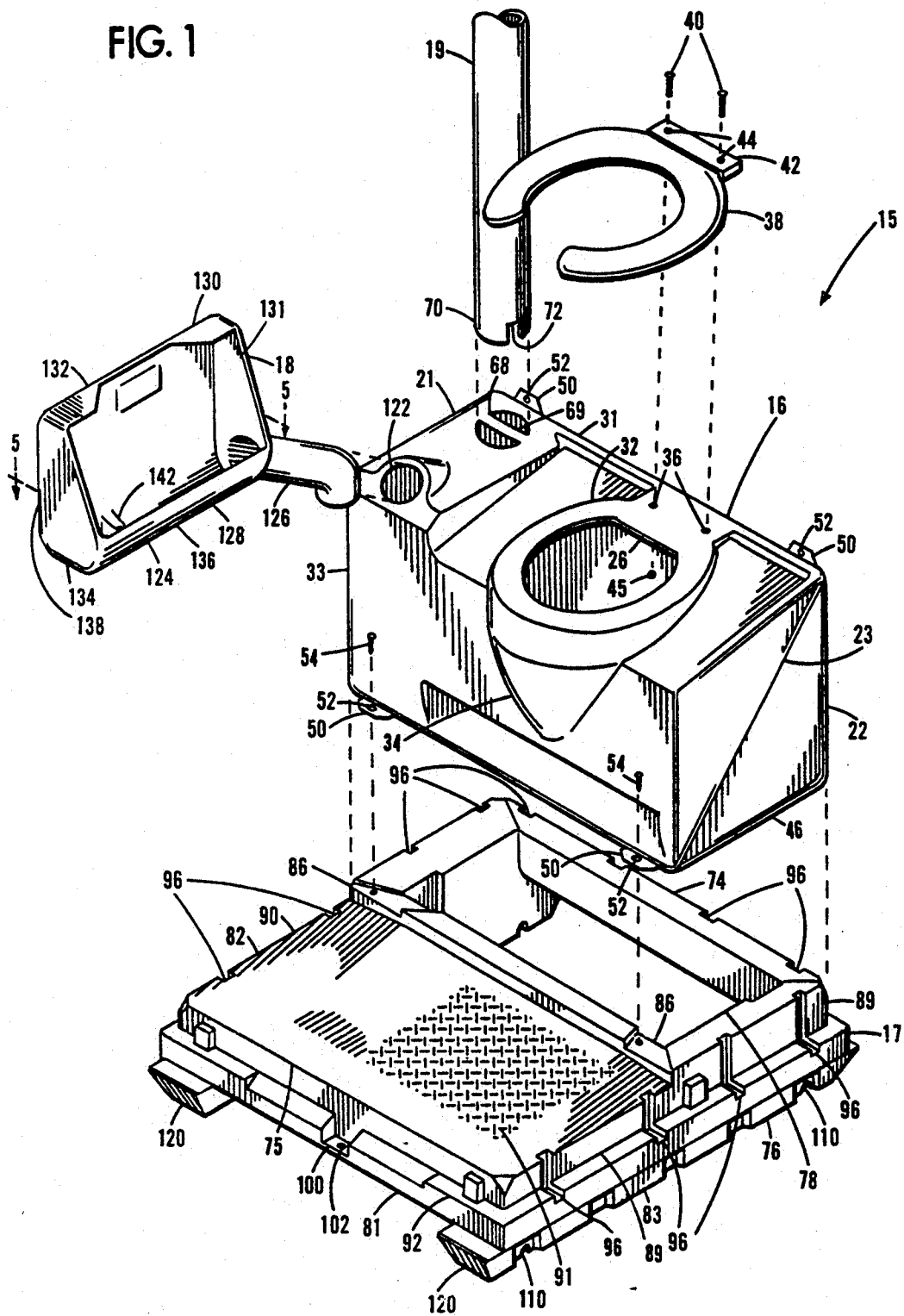
FIG. 1 is an exploded isometric view of the portable toilet assembly of this invention.
Figure 2:
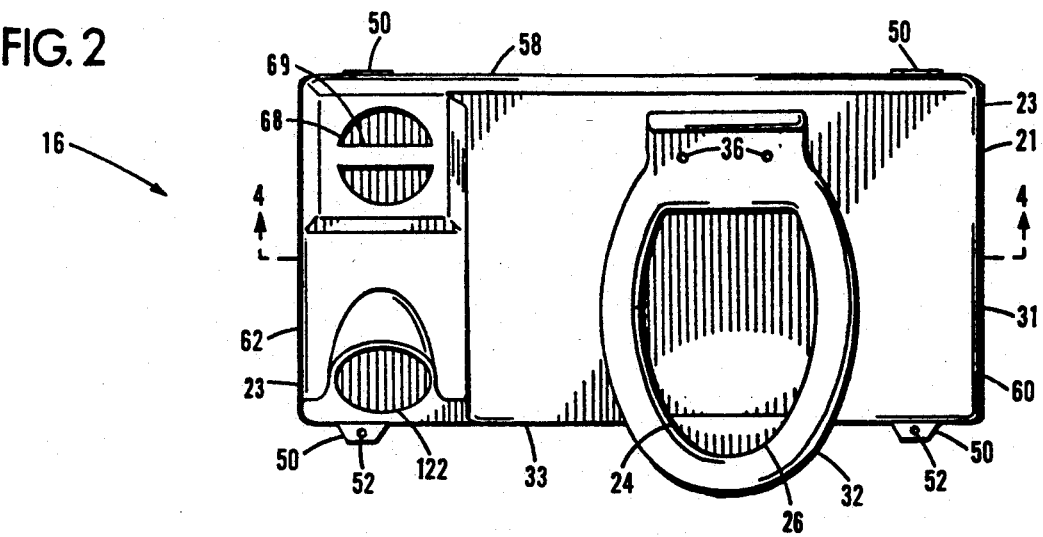
FIG. 2 is a top plan view of the toilet tank of FIG. 1.
Figure 3:
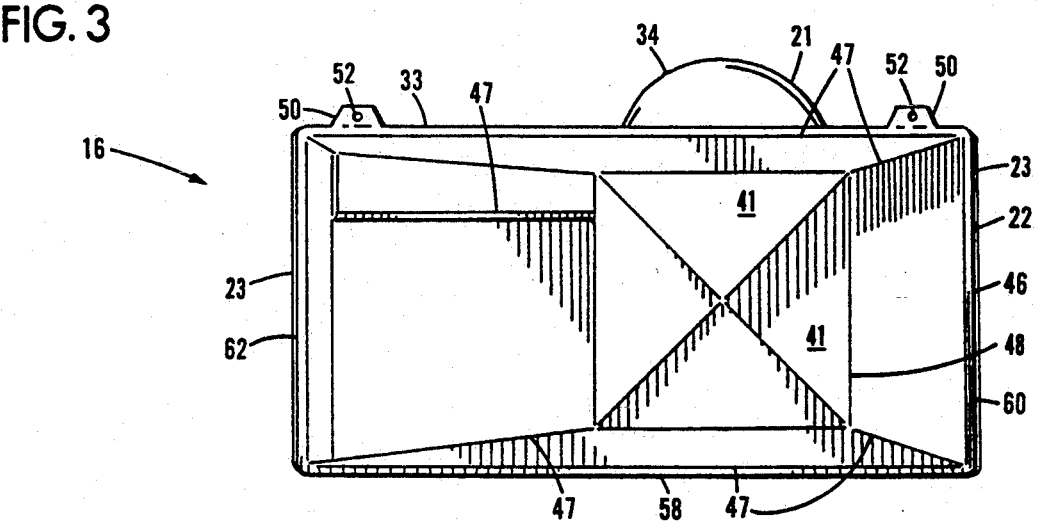
FIG. 3 is a bottom plan view of the toilet tank of FIG. 2.
Figure 8:
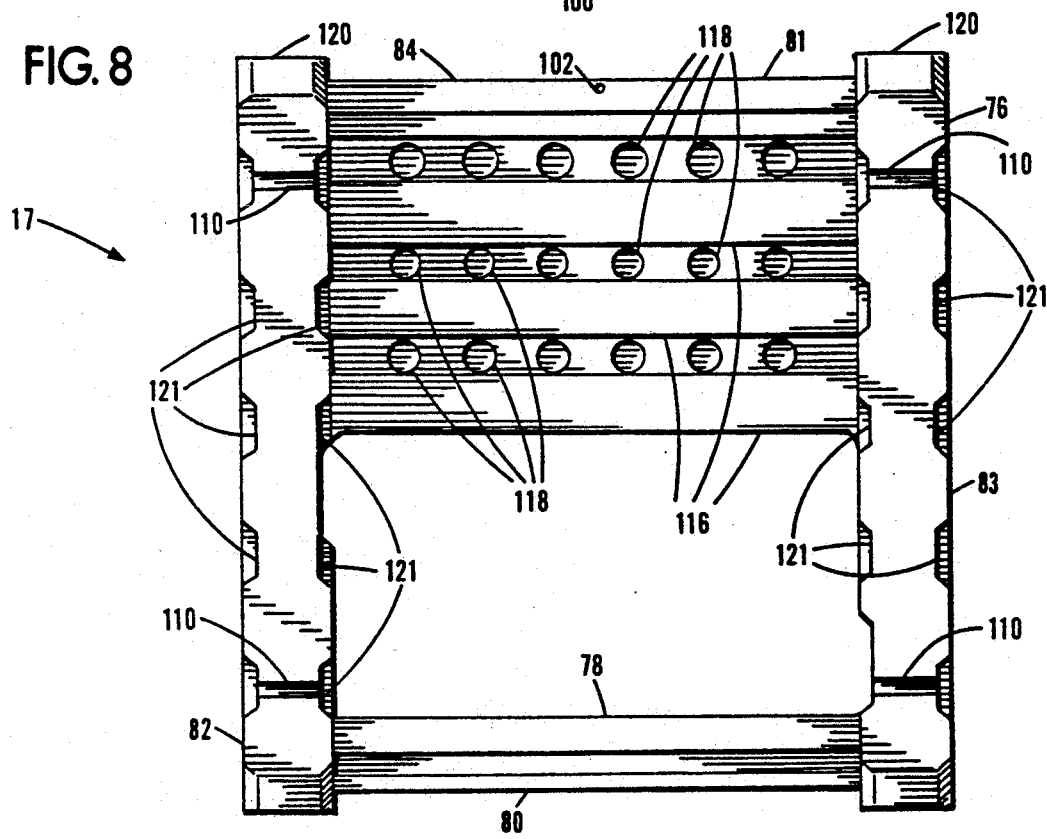
FIG. 8 is a bottom plan view of the toilet tank base of FIG. 7.
Figure 9:
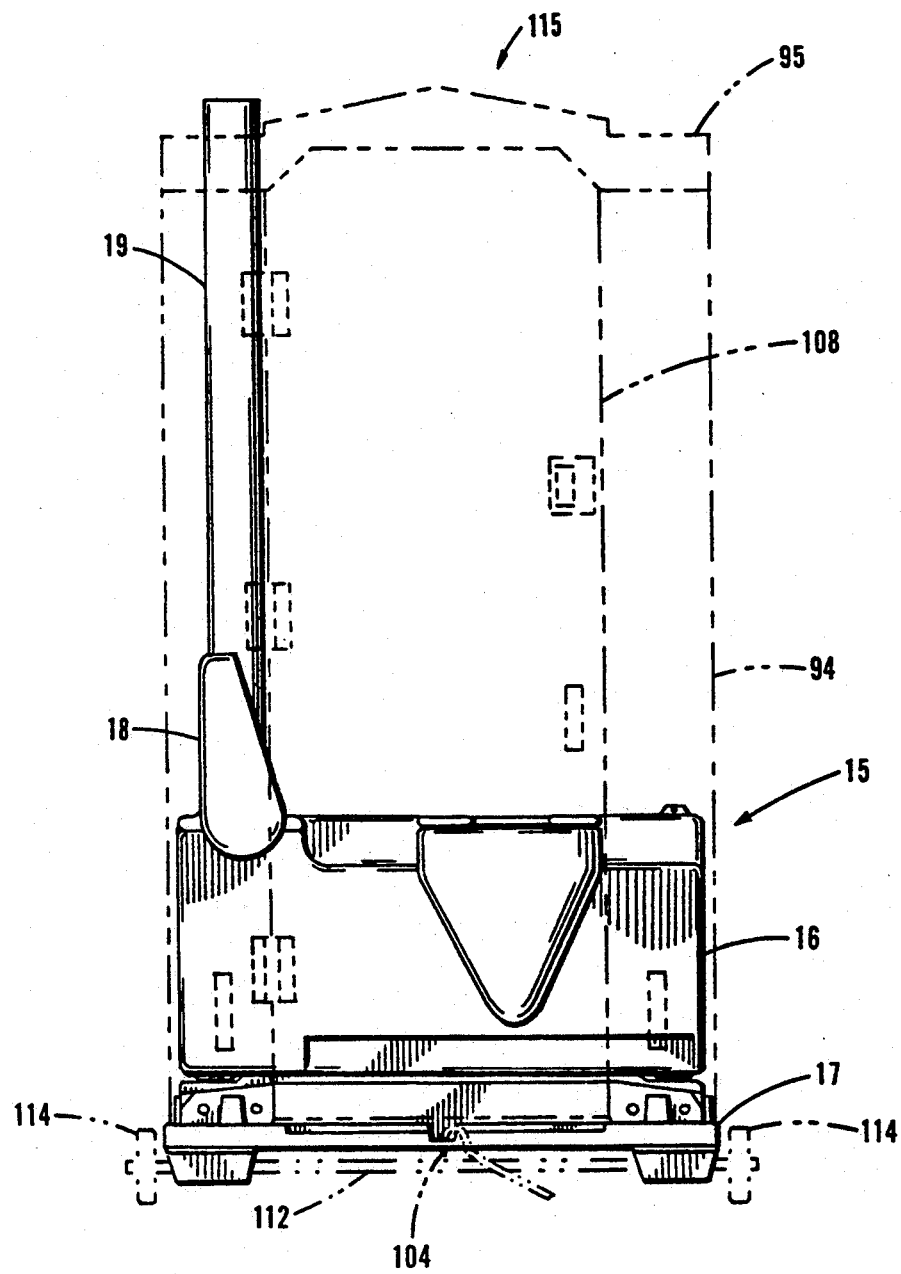
FIG. 9 is a front elevational view of the portable toilet assembly of FIG. 1 with a cabana structure shown in phantom view.

Referring more particularly to FIGS. 1-9 wherein like numbers refer to similar parts, a portable toilet assembly 15 is best shown in FIGS. 1 and 9.

The portable toilet assembly 15 includes a twin-sheet thermoformed plastic toilet tank 16 which is fastened to a twin-sheet thermoformed toilet tank base 17. A twin-sheet thermoformed plastic urinal 18 is attached to the tank 16. A ventilation stack 19 is also attached to the tank 16.

In the twin-sheet thermoforming process, two sheets of plastic material are first mounted onto an appropriate thermoforming vacuum mold. Each of the thermoforming vacuum molds is a one-sided mold having vacuum ports formed therein which draw the sheet of material against the mold. The sheet of material is heated so as to generally conform to the shape of the mold.

The two mold halves, each of which is one-sided by itself, are brought together compressing the two sheets of material between them. The two sheets are pressed together in a semi-molten state. Thus the material of each of the sheets fuses together, with the fused material of the two sheets forming a continuous seamless unitary object at each juncture. The molded article is then cooled, released from the molds and trimmed or routed as may be required.

Figure 6:
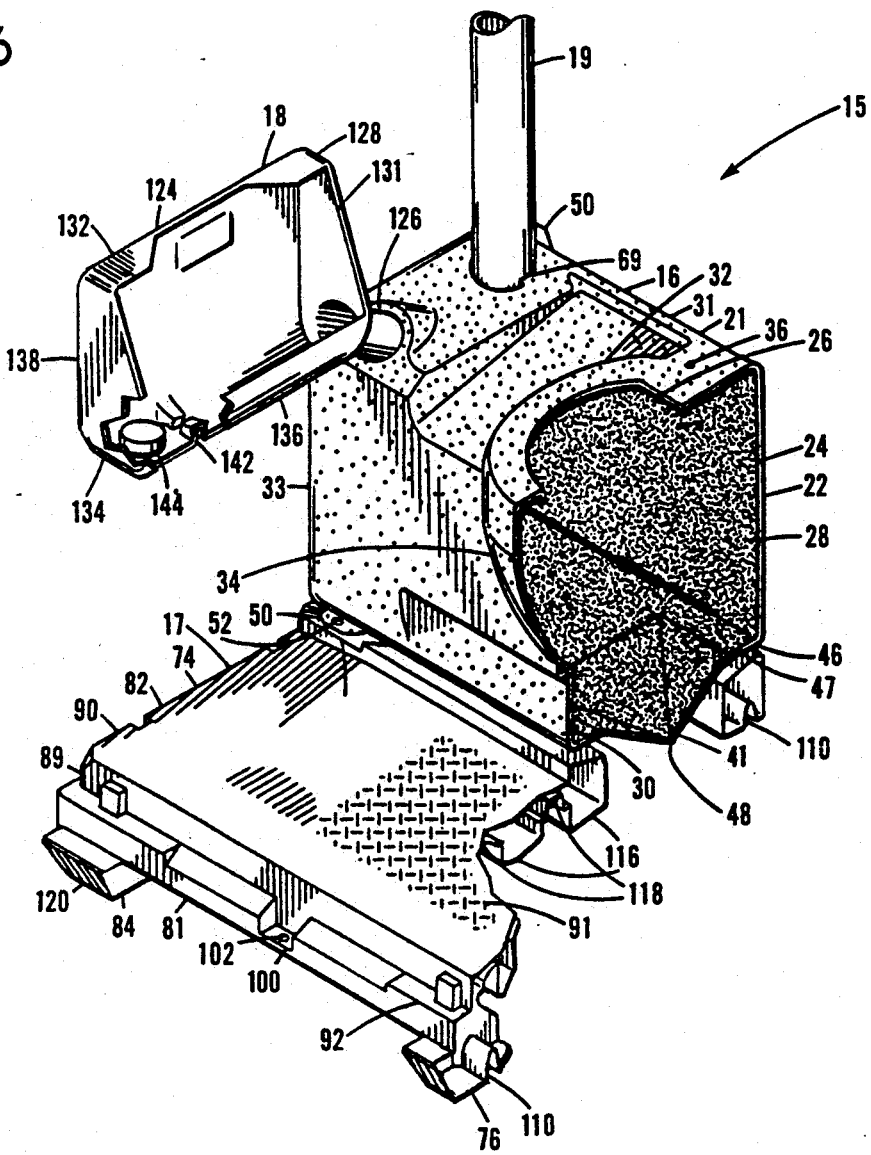
FIG. 6 is a partially schematic isometric cross-sectional view of the portable toilet assembly of this inven
Figure 7:
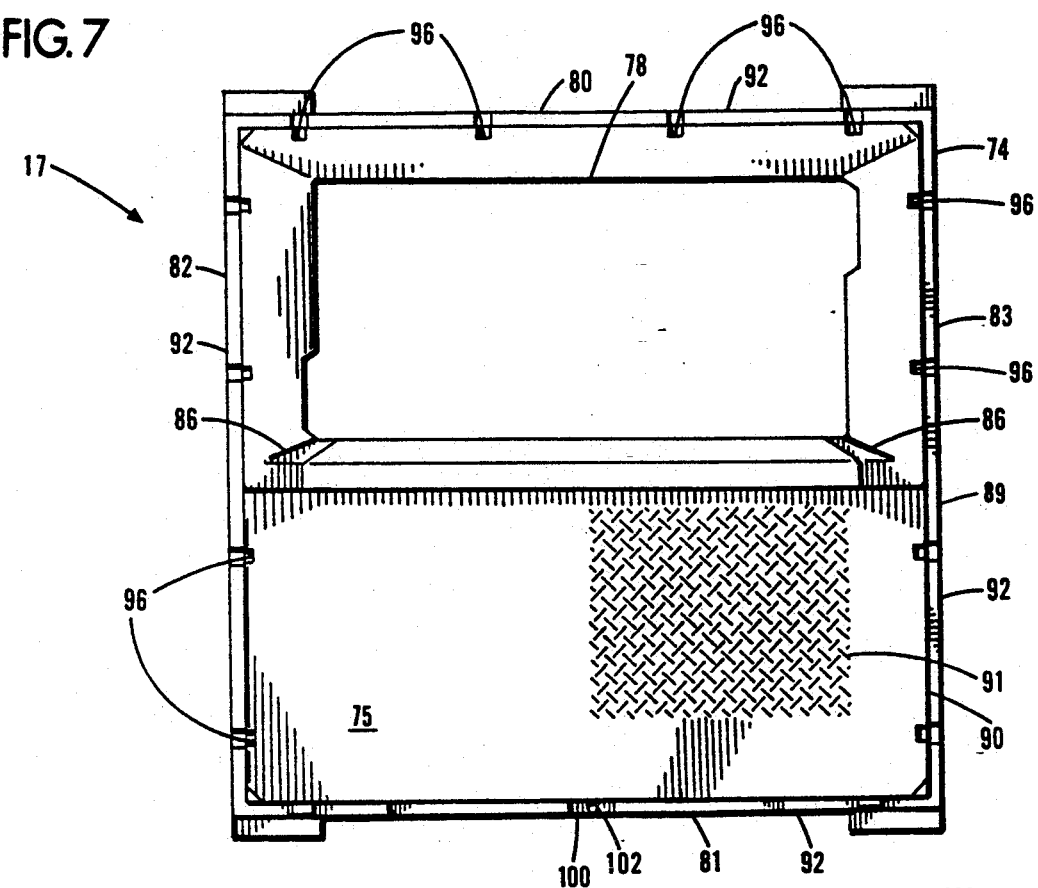
- FIG. 7 is a top plan view of the toilet tank base of FIG. 1.

The twin-sheet thermoformed plastic toilet tank 16, shown in FIGS. 1-4 and 6, has a tank upper sheet 21 and a tank lower sheet 22. The sheets 21, 22 are preferably 350 gauge BA50-100 high density polyethylene. The tank upper sheet 21 and the tank lower sheet 22 are fused together at a joinder area 23 which generally follows the mold parting line. The upper and lower sheets form a hollow cavity 24 for receiving and containing waste. The waste is introduced into the tank 16 through an opening 26 in the tank upper sheet 21. As shown in FIG. 6, the tank upper and lower sheets 21, 22 each have a first layer 28 and a second layer 30 of differently colored thermoplastic materials which have been coextruded as a unitary sheet. The layers 28 which form the inner surfaces of the tank cavity 24 are of a dark color plastic material, preferably black. The tank upper and lower sheets are molded with the first layers 28 facing one another such that the interior cavity 24 formed by the fused sheets is substantially one color and the exterior of the tank is substantially a different color. In the isometric cross-sectional view of FIG. 6, the dark layers 28 are indicated by a dense stippling and the light layers 30 are indicated by a less dense stippling. The dark color of the cavity 24 serves to disguise the contents of the tank from a user and obscures the interior of the tank 16. While the tank interior 24 is a dark color, it is desirable for presenting a sanitary and attractive appearance, as well as for heightened visibility, that the exterior surfaces of the tank be a light or bright color. The contrasting colors also facilitate locating the tank opening 26. The colors of the tank 16, because they are an integral part of the molded structure, will not chip, scratch, or run, and will endure as long as the tank 16 itself.

The upper sheet 21 of the tank 16 forms the top 31 of the tank 16 and has a raised portion defining a rim 32 around the tank opening 26. The tank upper sheet 21 also has a frontwardly facing tank section 33 which extends outwardly to form the toilet bowl 34. The rim 32 has two openings 36 to which a toilet seat 38 may be attached via fasteners such as bolts 40 which extend through holes 44 in the attachment portion 42 of the toilet seat 38. The bolts 40 are fastened with nuts 45.

Figure 4:
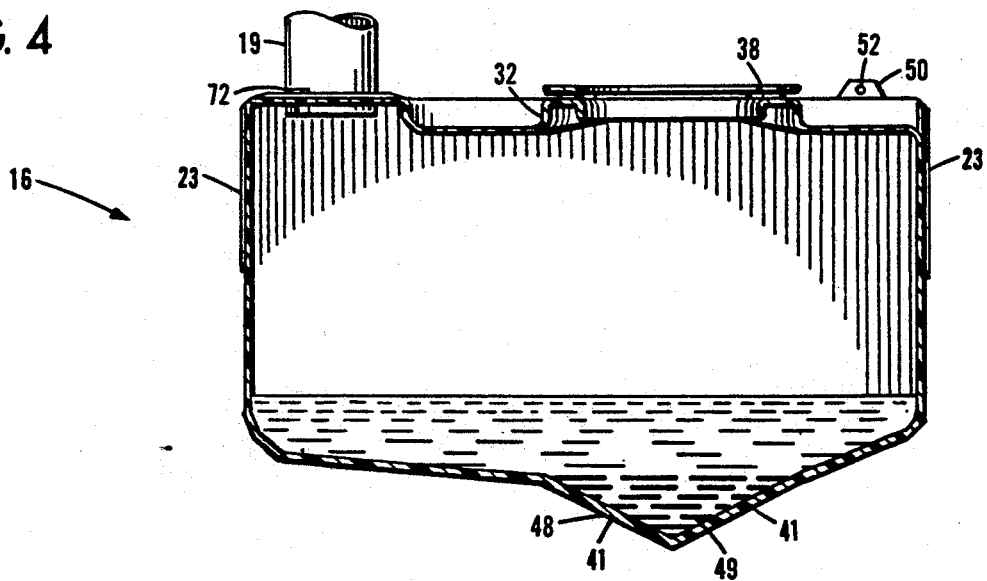
FIG. 4 is a cross-sectional view of the toilet tank of FIG. 2 taken along section line 4—4.

The lower tank sheet 22 has a bottom 46 with a downwardly tapered portion 47 and a further downwardly tapered portion forming a sump 48. The sump 48 is preferably in the shape of an inverted pyramid with inclined walls 41. The pyramidical sump shape adds rigidity to the sump 48 and narrows to a point in order to provide a low point to facilitate complete removal of the waste materials when the waste is suctioned from the toilet tank 16 in order to clean it. As shown in FIG. 4, denser waste materials 49 will tend to sink to the bottom of the sump 48. The walls 41 of the pyramidical shaped sump 48 serve to break up the feces in the waste and allow the liquid to seep under the broken up solid waste. This allows more compact storage of waste within the tank 16 and facilitates cleaning. To reduce odors, the tank 16 is preferably partially filled with a deodorizing liquid or alternately a solid deodorant is used.

The toilet tank 16 has flanges 50 which are formed from the fused upper and lower sheets and which protrude from the tank exterior. The flanges 50 each have a hole 52 which is adapted to receive a fastener 54. The flanges 50 are formed in the twin-sheet thermoforming process close to the mold separation line and hence are formed of double thicknesses of plastic which are integrally formed with the tank and hence securely anchored. Because the flanges 50 extend away from the tank, the tank may be securely fastened to a base or a cabana wall without in any way piercing the tank itself. Thus no gaskets or seals are needed around the fasteners 54 and the danger of leaking tank contents at the tank attachment points is eliminated.

The toilet tank 16 further has a rear side 58 formed by the tank lower sheet 22, a right side 60 and a left side 62. The right side 60 and the left side 62 are formed by the joinder of the tank upper sheet 21 and the tank lower sheet 22. The upper and lower sheets are fused together at the line of joinder or parting line 23. The parting line 23 encircles the tank and defines a meeting plane between the upper sheet 21 and the lower sheet 22. The parting line on each side 60, 62 extends from a point on the bottom 46 to a point on the tank top 31. By forming an inclined parting line the removal of the tank from the thermoforming molds is facilitated. This structure also adds stiffness to the sides 60, 62. Two flanges 50 are located at the front bottom sides of the tank. The first flange 50 is located at the bottom front right side of the tank, and the second flange 50 is located at the bottom front left side of the tank. Each of these flanges 50 are used for mounting the tank 16 to the toilet tank base 17. The toilet tank 16 also has a second set of flanges 50 located at the rear top right side of the tank and at the rear top left side of the tank. The top flanges are used for fastening the tank to the wall of a cabana 95.

The toilet tank 16 has a ventilation stack opening 68 on the tank top 31 for the insertion of the ventilation stack 19. The ventilation stack opening 68 is divided by a strip 69. The lower end 70 of the ventilation stack 19 has a cutout rectangular L-shaped slot 72 such that the L-shaped slot 72 can slip over the ventilation stack opening strip 69, drop down and engage the strip 69 in a portion of the L-shaped slot 72.

The toilet tank base 17, best shown in FIGS. 1, 6, 7, and 8, is formed from a thermoplastic base upper sheet 74 and a thermoplastic base lower sheet 76 which are fused to each other. The base 17 further has portions defining a hole 78 which is formed by the fused base upper sheet 74 and base lower sheet 76 and is adapted to receive the toilet tank 16. The base 17 forms a generally rectangular structure with a top 75, a rear 80, a front 81, two sides 82, 83, and a bottom 84. The hole 78 penetrates the top 75 and bottom 84 of the base 17 and is generally rectangular having sloping tapered sides to accommodate the downwardly descending tapered walls 47 of the toilet tank 16. This provides additional stability for the tank, with the base acting as a cradle for receiving the tank 16. Flange recesses 86 are located on the top front surface of the base 17 adjacent to the hole 78 and are recessed to accommodate the lower flanges 50 of the toilet tank 16 and are adapted to receiving a fastener 54 such as a bolt.

The base top surface 75 has an upper platform 90 adjacent to the hole 78. The upper platform 90 has projections 91 which form a non-skid surface to prevent slipping when the platform is wet or soiled.

The base upper sheet 74 has a side wall 89 which extends downwardly on all four sides from the base top surface 75. A ledge 92 extends outwardly from the side wall 89 of the base upper sheet 74. The ledge 92 engages against the walls 94 of a cabana structure 95.

The upper sheet 74 has channels 96 which are depressions which extend vertically in the side wall 89 of the base upper sheet 74 and horizontally into the ledge 92. The channels 96 provide a passage or duct beneath the cabana walls 94 which allow the escape of liquids from the base 17 while obstructing a direct view of the cabana interior. The channels 96 permit efficient cleaning of the assembly 15 such as by use of a water hose while avoiding pooling of water or other spilled liquids on the top surface 75. The channels 96 also allow fresh air from the cabana exterior to be drawn into the interior.

The base front has a notch 100 which is a depression on the side wall 89 which permits the passage of liquids and gases from beneath any cabana door 108 which would be mounted to the front 81 of the base 17. The base upper sheet 74 forming the notch 100 is fused to the base lower sheet 76. The notch 100 has a circular opening 102 at the fused portion. The circular opening 102 is used for attaching a C-hook 104 to facilitate transportation of the assembled unit.

As shown in FIGS. 6 and 8, the lower base sheet 76 has portions defining axle bearings 110 located in the lower right rear side, lower left front side, lower right front side, and lower left rear side. As shown in FIG. 9, the bearings 110 accommodate an axle 112 to which wheels 114 are mounted for use in transporting the toilet facility 115 which includes the cabana 95 and the portable toilet assembly 15. On the bottom side 84 of the base 17, ribs 116 are formed between the base upper sheet 74 and base lower sheet 76. The ribs 116 are parallel to the front 81 of the base 17. Fusion points 118 of the base upper and lower sheets 74, 76 give further structural stability underneath the platform portion 90 of the base 17. Side rails 120 are molded along each of the left and right sides 82, 83 of the base lower sheet 76. The base ribs 116 are perpendicular to the side rails 120. The side rails protrude beneath the ribs 116 so that only the rails are in contact with the ground. The side rails 120 have indentations 121 to form a more rigid structure.

Figure 5:
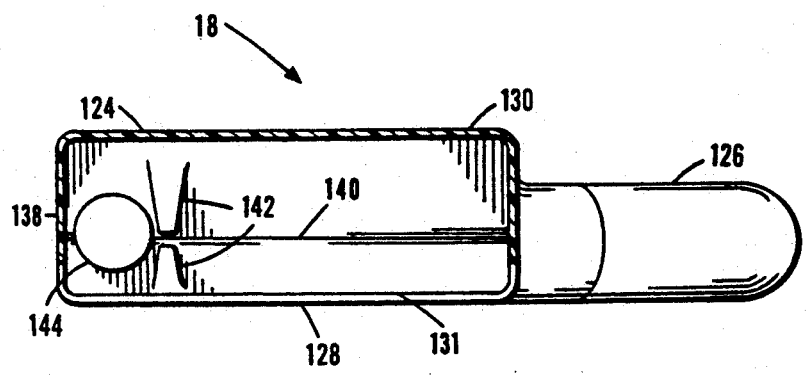
FIG. 5 is a cross-sectional view of the urinal of FIG. 1. taken along section line 5—5.

As shown in FIGS. 1, 5 and 6, the portable toilet assembly 15 has a twin-sheet thermoformed plastic urinal 18 which is connected to the toilet tank 16 through a urinal discharge opening 122 in the tank top 31 of the tank upper sheet 21. The urinal 18 has a urinal bowl 124 for receiving urine and a urinal discharge 126 for transferring the urine from the urinal bowl 124 into the toilet tank 16 through the urinal discharge opening 122.

A thermoplastic urinal front sheet 128 and a thermoplastic urinal rear sheet 130 form the urinal bowl 124 and the urinal discharge 126. An interior cavity 131 is formed by joining the two sheets 128 and 130. The urinal rear sheet 130 forms the back 132 and part of the bottom 134 of the urinal 18. The urinal front sheet 128 forms part of the urinal bottom 134, the front 136 and portions of the side 138 of the urinal. The front and rear sheets 128, 130 are joined at a joinder line 140 traversing through the side 138, through the urinal discharge 126 and bottom of the urinal 134. As shown in FIG. 6 the front bottom interior and the rear bottom interior of the urinal 18 have protrusions 142 which are raised sufficiently to hold a solid deodorant puck 144 to reduce odors from use of the urinal 18. The bottom 134 of the urinal is sloped to ensure proper drainage. The protrusions 142 prevent the deodorant puck from being dislodged or washed into the tank 16 itself. Alternatively, the sheets 128, 130 may have portions defining a single protrusion extending from the urinal bottom, with openings on either side of the protrusion to provide for the passage of urine.

It is understood that the invention is not confined to the particular construction and arrangement of parts herein illustrated and described, but embraces such modified forms thereof as come within the scope of the following claims.

We claim:

1. A twin-sheet thermoformed plastic toilet tank comprising:
    a) a thermoplastic tank upper sheet, having portions defining a tank opening; and
    b) a thermoplastic tank lower sheet, wherein portions of the lower sheet are fused to the upper sheet to form a hollow cavity for receiving and containing human waste introduced through the tank opening, and the upper and lower sheets each have first and second coextensive thermoplastic layers, and the first layer is of a different color than the second layer, such that the first layers of the two sheets oppose one another and define the cavity such that the cavity formed by the fused sheets is substantially one color and the exterior of the tank is substantially another color; and wherein portions of the fused upper and lower sheets protrude from the tank exterior to form at least one flange adapted for attachment to a supporting surface and the flange has portions which define a hole adapted to receive a fastener.

2. The toilet tank of claim 1 wherein the tank lower sheet has downwardly descending portions defining an inverted pyramidal depression within the cavity which acts as a sump for retaining solid wastes.

3. A twin-sheet thermoformed toilet tank comprising:

a) a thermoplastic tank upper sheet, having portions defining a generally horizontal top with a tank opening formed therein; and
b) a thermoplastic tank lower sheet extending beneath the tank upper sheet, wherein portions of the lower sheet are fused to the upper sheet to form a hollow cavity for receiving and containing human waste introduced through the tank opening, and wherein a plurality of flanges are formed by the fused portions and the flanges extend upwardly from the toilet tank top and receive fasteners therethrough for attachment of the tank.

4. The toilet tank of claim 3 wherein the tank lower sheet has downwardly descending portions defining a depression within the cavity which narrows as it extends downwardly, the depression serving as a sump for retaining and breaking up solid waste deposited within the tank cavity.

5. The toilet tank of claim 3 wherein the tank upper sheet and the tank lower sheet each have first and second coextensive colored layers and the first layer is a darker color than the second layer, wherein the first layers of the upper and lower sheets are opposed and define the tank cavity, and the second layers define the tank exterior, such that the tank cavity is a darker color than the tank exterior.

6. The toilet tank of claim 3 further comprising:
a) portions of the upper sheet which define a urinal discharge opening;
b) a twin-sheet thermoformed thermoplastic urinal having a bottom adapted to receive urine and inclined towards a discharge tube extending from the bottom into the tank urinal discharge opening; and
c) protrusions extending upwardly from the bottom, the protrusions being adapted to restrain the movement towards the discharge tube of a urinal deodorant puck placed on the urinal bottom.

7. A twin-sheet thermoformed plastic toilet tank comprising:
a) a thermoplastic tank upper sheet, the upper sheet defining a tank top having portions defining an opening for the entry of human waste, and a front wall which extends downwardly from the tank top; and
b) a thermoplastic tank lower sheet defining a tank bottom generally parallel to and spaced below the tank top and a tank rear wall which extends upwardly from the tank bottom, wherein portions of the lower sheet are fused to the upper sheet along a parting line and wherein the tank has left and right sides which are formed of portions which extend downwardly from the first sheet top which are fused along the parting line to portions which extend upwardly from the lower sheet bottom, the parting line on each side extending from a point on the bottom to a point on the tank top, the top, bottom, front wall, rear wall, left side, and right side defining a hollow cavity for receiving and containing human waste introduced through the tank opening, and wherein portions of the fused upper and lower sheets protrude from the tank exterior to form at least one flange adapted for attachment to a supporting surface and the flange has portions which define a hole adapted to receive a fastener.

8. The toilet tank of claim 7 wherein the tank lower sheet has downwardly descending portions defining a depression within the cavity which narrows as it extends downwardly, the depression serving as a sump for retaining and breaking up solid waste deposited within the tank cavity.

9. The toilet tank of claim 7 wherein the tank upper sheet and the tank lower sheet each have first and second coextensive colored layers and the first layer is a darker color than the second layer, wherein the first layers of the upper and lower sheets are opposed and define the tank cavity, and the second layers define the tank exterior, such that the tank cavity is a darker color than the tank exterior.

10. The toilet tank of claim 7 further comprising:
a) portions of the upper sheet which define a urinal discharge opening;
b) a twin-sheet thermoformed thermoplastic urinal having a bottom adapted to receive urine and inclined towards a discharge tube extending from the bottom into the tank urinal discharge opening; and
c) protrusions extending upwardly from the bottom, the protrusions being adapted to restrain the movement towards the discharge tube of a urinal deodorant puck placed on the urinal bottom.

11. A twin-sheet thermoformed thermoplastic toilet tank comprising:
a) thermoplastic tank upper sheet, having portions defining a generally horizontal top with a tank opening formed therein; and
b) a thermoplastic tank lower sheet extending beneath the tank upper sheet, wherein portions of the lower sheet are fused to the upper sheet to form a hollow cavity for receiving and containing human waste introduced through the tank opening, and wherein a plurality of flanges are formed by the fused portions and the flanges extend outwardly from a front of the toilet tank and receive fasteners therethrough for attachment of the tank.

* * * * *